US010883561B2

(12) United States Patent
Beckmann et al.

(10) Patent No.: US 10,883,561 B2
(45) Date of Patent: Jan. 5, 2021

(54) HYDRAULIC MOUNT

(71) Applicant: VIBRACOUSTIC GMBH, Darmstadt (DE)

(72) Inventors: Wolfgang Beckmann, Darmstadt (DE); Peter Farrenkopf, Viernheim (DE); Bjoern Helly, Laudenbach (DE); Kurt Stein, Morlenbach (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 16 days.

(21) Appl. No.: 15/773,265

(22) PCT Filed: Nov. 2, 2016

(86) PCT No.: PCT/EP2016/076443
§ 371 (c)(1),
(2) Date: May 3, 2018

(87) PCT Pub. No.: WO2017/076914
PCT Pub. Date: May 11, 2017

(65) Prior Publication Data
US 2018/0320753 A1 Nov. 8, 2018

(30) Foreign Application Priority Data
Nov. 4, 2015 (DE) .......................... 10 2015 118 931

(51) Int. Cl.
*F16F 13/10* (2006.01)
*F16F 13/00* (2006.01)
*B60K 5/12* (2006.01)

(52) U.S. Cl.
CPC .......... *F16F 13/103* (2013.01); *B60K 5/1208* (2013.01); *F16F 13/102* (2013.01);
(Continued)

(58) Field of Classification Search
CPC .. F16F 13/103; F16F 13/102; F16F 2226/041; F16F 2230/105; F16F 2232/08;
(Continued)

(56) References Cited

U.S. PATENT DOCUMENTS 4,796,875 A * 1/1989 Mertens ................ F16F 13/105
251/339
4,840,358 A * 6/1989 Hoying .................... F16F 13/20
248/566

(Continued)

FOREIGN PATENT DOCUMENTS

DE         3447746 A1      7/1986
DE    102010046885 B3      2/2012
(Continued)

OTHER PUBLICATIONS

International Search Report PCT/EP2016/076443, dated Feb. 10, 2017.

Primary Examiner — Bradley T King
Assistant Examiner — James K Hsiao
(74) Attorney, Agent, or Firm — Fishman Stewart PLLC

(57) ABSTRACT

The invention relates to a hydraulic mount, including a hydraulic mount for mounting a motor vehicle engine on a vehicle body. In embodiments, the hydraulic mount includes: a hydraulic module with a support spring that supports a mount core, surrounds a working chamber, and is supported on an outer ring on which a cover is fixed, a compensation chamber which is separated from the working chamber by an intermediate plate and is delimited by a compensation membrane, wherein the compensation chamber and the working chamber are filled with a damping liquid and are connected with each other in a liquid-conducting manner via a damping channel arranged in the intermediate plate; and a housing accommodating the hydraulic module. In embodiments, the outer ring includes (Continued)

a radial projection with a rubber-lined axial abutment surface and a non-rubber-lined radial outer surface.

7 Claims, 2 Drawing Sheets

(52) U.S. Cl.
CPC ... *F16F 2226/041* (2013.01); *F16F 2230/105* (2013.01); *F16F 2232/08* (2013.01); *F16F 2236/04* (2013.01); *F16F 2238/04* (2013.01)

(58) Field of Classification Search
CPC .. F16F 2236/04; F16F 2238/04; B60K 5/1208
See application file for complete search history.

(56) References Cited

U.S. PATENT DOCUMENTS

| | | | | |
|---|---|---|---|---|
| 5,707,047 | A * | 1/1998 | Meyering | F16F 13/106 267/140.13 |
| 8,403,097 | B2 * | 3/2013 | Joly | F16F 1/373 180/291 |
| 2002/0089105 | A1 * | 7/2002 | Fujita | F16F 6/005 267/140.14 |
| 2003/0030202 | A1 * | 2/2003 | Thomazeau | F16F 13/105 267/140.13 |
| 2003/0038414 | A1 * | 2/2003 | Pizanti | F16F 13/103 267/140.13 |
| 2004/0021259 | A1 * | 2/2004 | Visage | F16F 7/00 267/140.13 |
| 2004/0212133 | A1 * | 10/2004 | Thomazeau | F16F 13/106 267/140.13 |
| 2005/0001364 | A1 * | 1/2005 | Visage | F16F 13/103 267/140.4 |
| 2006/0006593 | A1 * | 1/2006 | Bretaudeau | F16F 13/268 267/140.14 |
| 2012/0267184 | A1 | 10/2012 | Joly et al. | |
| 2012/0298831 | A1 | 11/2012 | Kato | |
| 2013/0264756 | A1 * | 10/2013 | Daito | F16F 13/08 267/140.13 |
| 2014/0175719 | A1 * | 6/2014 | Kanaya | F16F 13/106 267/140.13 |
| 2015/0260254 | A1 * | 9/2015 | Furumachi | F16F 13/103 267/140.13 |

FOREIGN PATENT DOCUMENTS

| | | |
|---|---|---|
| DE | 102013206290 A1 | 10/2014 |
| EP | 1628040 A1 | 2/2006 |
| GB | 2354813 A | 4/2001 |

* cited by examiner

HYDRAULIC MOUNT

CROSS-REFERENCE TO RELATED APPLICATION

This application is a National Stage Patent Application of International Patent Application No. PCT/EP2016/076443, filed Nov. 2, 2016, which claims the benefit of German Application Serial No. 10 2015 118 931.3, filed Nov. 4, 2015, the contents of both are incorporated by reference in their entireties.

TECHNICAL FIELD

The present invention relates to a hydraulic mount, in particular for mounting a motor vehicle engine on a vehicle body, comprising: a hydraulic module with a support spring that supports a mount core, surrounds a working chamber, and is supported on an outer ring on which a cover is fixed, a compensation chamber which is separated from the working chamber by an intermediate plate and is delimited by a compensation membrane, wherein the compensation chamber and the working chamber are filled with a damping liquid and are connected with each other in a liquid-conducting manner via a damping channel arranged in the intermediate plate, and a housing accommodating the hydraulic module. Further, the invention relates to a method for installing such a hydraulic mount.

BACKGROUND

Such hydraulically damping mounts are used, in particular, for supporting a motor vehicle engine on a vehicle body in order to, on the one hand, dampen the vibrations caused by road bumps and, on the other hand, to provide insulation against acoustic vibrations. The vibrations caused by road bumps are dampened by a hydraulic system, with the hydraulic system being formed by the liquid-dampened working chamber, the compensation chamber and the damping channel connecting the two chambers with each other. The mode of operation of the hydraulic system can be described as follows: The working chamber is made larger or smaller by a movement of the support spring, with the liquid located in the working chamber being pressed via the damping channel into the compensation chamber. The liquid oscillating in the damping channel causes a damping action. Hydraulic mounts of the type mentioned above usually comprise a hydraulic module and a housing accommodating the hydraulic module.

Such a hydraulic mount is disclosed, for instance, in EP 1 628 040 A1. In the case of the hydraulic mount disclosed therein, the hydraulic module is inserted into the housing with a translational movement. The hydraulic mount installed in this manner is then sealed by crimping the housing. The mount outer ring has a radial rubber lining to cause a secure fixation in the housing in the circumferential direction. In the hydraulic mount disclosed, the hydraulic module and housing are connected non-positively.

Due to the design of the hydraulic module, it can often only be inserted into the housing by means of a rotary movement. To this end, a certain amount of clearance must be provided between the hydraulic module and the housing.

SUMMARY

Therefore, it is the object of the invention to propose a hydraulic mount of the type mentioned in the introduction, which can be installed in the housing by means of a rotary movement and is improved with regard to noise development in the case of transverse load.

This object is achieved by means of a hydraulic mount according to claim 1 and by a method according to claim 9. Advantageous embodiments of the hydraulic mount are the subject matter of the dependent claims.

In the hydraulic mount according to the invention, the outer ring has a radial projection. The radial projection has a rubber-lined axial abutment surface and a non-rubber-lined radial outer surface. Component tolerances are compensated by the rubber lining on the axial abutment surface, so that a surface contact is provided at an axial abutment between the housing and the hydraulic module. By means of the increase in contact surface area thus obtained in comparison with a linear contact or only point-shaped contact caused by tolerances, and by means of the higher friction coefficient of the rubber as compared with the material of the outer ring, a transition from static friction to sliding friction, which occurs at this location during operation due to transverse forces, is shifted into a technically irrelevant range. Unwanted noises that are perceptible to customers and are caused by the so-called stick-slip phenomenon are thus suppressed. The non-rubber-lined radial outer surface permits a rotary movement of the hydraulic module in the housing.

Advantageously, the outer ring has an axially projecting flange with an annular groove for clipping in a cover. Thus, a simple assembly of the cover can be achieved.

In an advantageous embodiment, the housing reaching around the outer ring and a clip of the cover abuts against the axial abutment surface of the outer ring.

Advantageously, the outer ring is made from a plastic, in particular from polyamide.

Advantageously, the thickness of the rubber lining of the axial abutment surface is between 0.5 mm and 2 mm.

Advantageously, a radial clearance is provided between the hydraulic module and the housing. Thus, the hydraulic module can be rotated more easily by an installation angle when installing the hydraulic module in the housing.

In an advantageous embodiment, the hydraulic module is fixed in the housing by means of a rotary movement. In this case, a stop may be provided on the housing which limits the rotary movement of the hydraulic module. Furthermore, a link guide may be provided on the housing which guides the rotary movement of the hydraulic module.

In an advantageous embodiment, the hydraulic module is fixed to the housing by means of crimping. In other embodiments, it is possible and common to fix the hydraulic module by means of a clip connection or clamping between the housing and the vehicle body.

Moreover, the invention relates to a method for the assembly of a hydraulic mount comprising a hydraulic module and a housing accommodating the hydraulic module, the method comprising the following method steps:

a) inserting the pre-assembled hydraulic module into the housing in such a manner that the bump stops can be guided through the connecting opening.

b) rotating the hydraulic module relative to the housing by an installation angle so that the housing abuts against the axial abutment surface and reaches around the outer ring and a clip of the cover.

c) crimping the housing for fixing and securing the hydraulic module in the housing in the axial direction.

BRIEF DESCRIPTION OF THE DRAWINGS

The invention is explained below in more detail with reference to an exemplary embodiment that is schematically depicted in the drawings. In the drawing.

DETAILED DESCRIPTION

Figure 1:
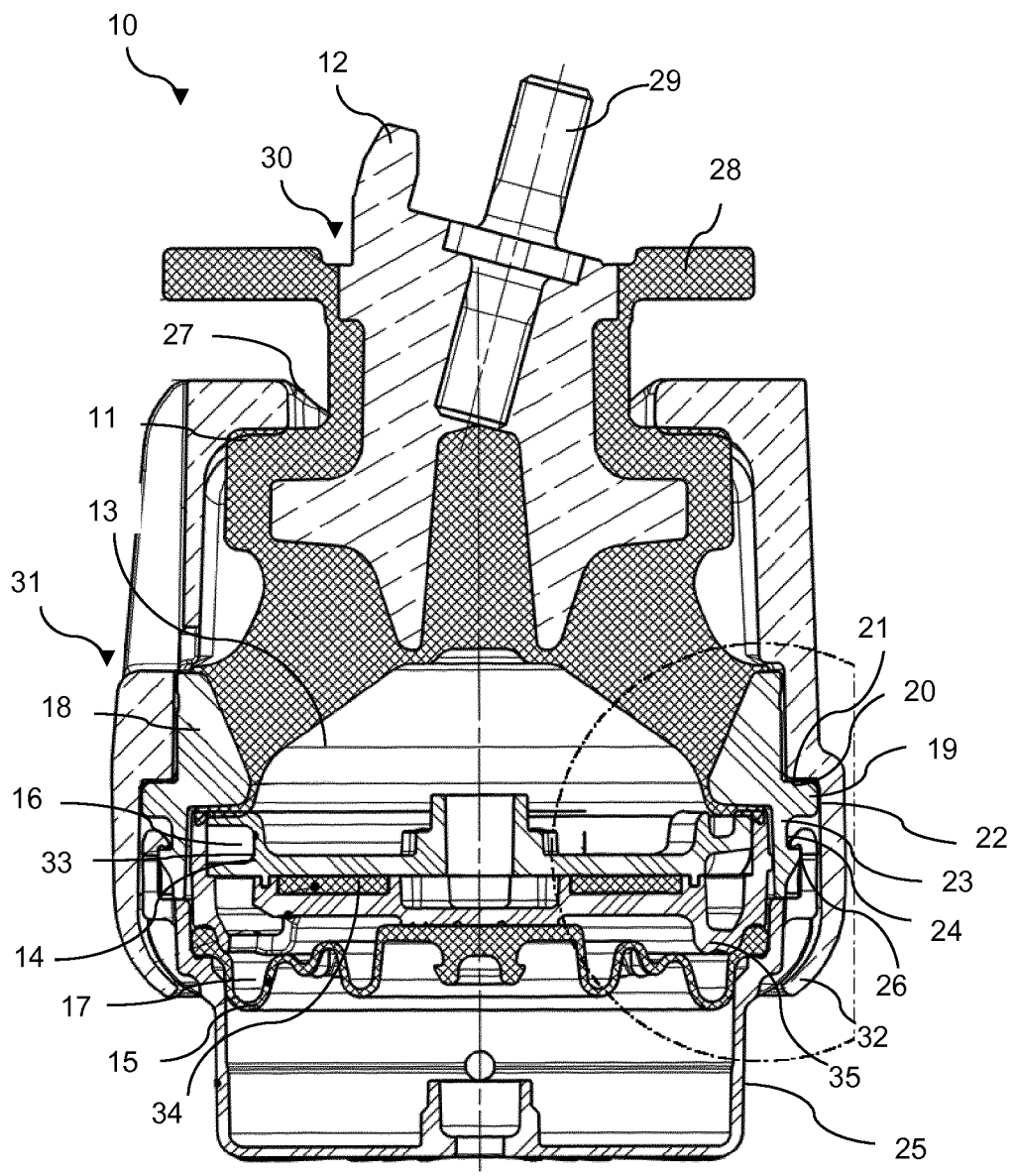
FIG. 1 shows a vertical section through a hydraulic mount according to the invention.

FIG. 1 illustrates a hydraulic mount 10 for mounting a motor vehicle engine that is not shown on a vehicle body that is not shown. The hydraulic mount 10 has a support spring 11 consisting of an elastomeric material for supporting a mount core 12 vulcanized thereinto. The engine is attached to the mount core 12. A screw coupling 29 is inserted into the mount core 12.

The support spring 11 delimits a working chamber 13, which is separated from a compensation chamber 17 by means of an intermediate plate 14. The compensation chamber 17 is delimited by a compensation membrane 15, which is also referred to as a roller bellows. The chambers 13 and 17 are filled with a hydraulic liquid and connected to each other in a liquid-conducting manner via a damping channel 16 disposed in the intermediate plate 14.

The intermediate plate 14 has an upper nozzle plate 33 and a lower nozzle plate 35. The upper nozzle plate 33 and the lower nozzle plate 35 are made from plastic. A decoupling membrane 34 is accommodated between the upper nozzle plate 33 and the lower nozzle plate 35.

An outer ring 18, which consists of polyamide, for example, is attached by vulcanization to the support spring 11. The outer ring 18 has a radial projection 19 with an axial abutment surface 20 and a radial outer surface 22. A rubber lining 21 is applied to the axial abutment surface 20, as can be easily seen particularly in FIG. 2. Furthermore, the outer ring 18 has an axially projecting flange 23 with an annular groove 24. The support spring 11 with the outer ring 18 and a cover 25 are connected to each other by means of a clip 26 of the cover 25, which engages into the annular groove 24 of the flange 23, and lock the intermediate plate 14 and the compensation membrane 15 between them, and together form the hydraulic module 30.

As shown in FIG. 1, the hydraulic module 30 is inserted into the housing 31. FIG. 1 represents a view of the fully assembled hydraulic mount 10 after a rotary movement of the hydraulic module 30 in the housing 31 has been carried out.

During assembly, the hydraulic module 30 is first inserted into the housing 31 with a translational movement, so that the bump stops 28 can be guided through the connecting opening 27. Then, the hydraulic module 30 is rotated relative to the housing 31 by an installation angle by means of a rotary movement, so that the housing 31 abuts against the axial abutment surface 20 and reaches around the outer ring 18 and the clip 26 of the cover 25. Finally, the assembly of the hydraulic mount 10 is completed by crimping the housing 31 for fixing and securing the hydraulic module 30 in the housing 31.

In the assembled state, the bump stops 28 protrude over the connecting opening 27, as can be seen particularly in FIG. 1. The housing 31 abuts against the rubber lining 21 of the axial abutment surface 20 in the axial direction. The component tolerances of the outer ring 18 and the housing 31 are compensated by the elasticity of the rubber, so that the outer ring 18 and the housing 31 are in contact via a definable ring surface. Furthermore, clearance is provided in the radial direction between the housing 31 and the outer ring 18.

The housing 31 completely encloses the outer ring 18 and the clip 26 of the cover 25. Finally, the hydraulic module 30 is fixed in the housing 31 by crimping the housing 31, so that a crimp 32 is formed at the end of the housing 31.

Due to crimping, the hydraulic module 30 is additionally pulled towards the housing 31, whereby the surface pressure prevailing on the axial abutment surface 20 and the rubber lining 21 is increased. This additionally shifts the transition from static friction to sliding friction.

Figure 2:
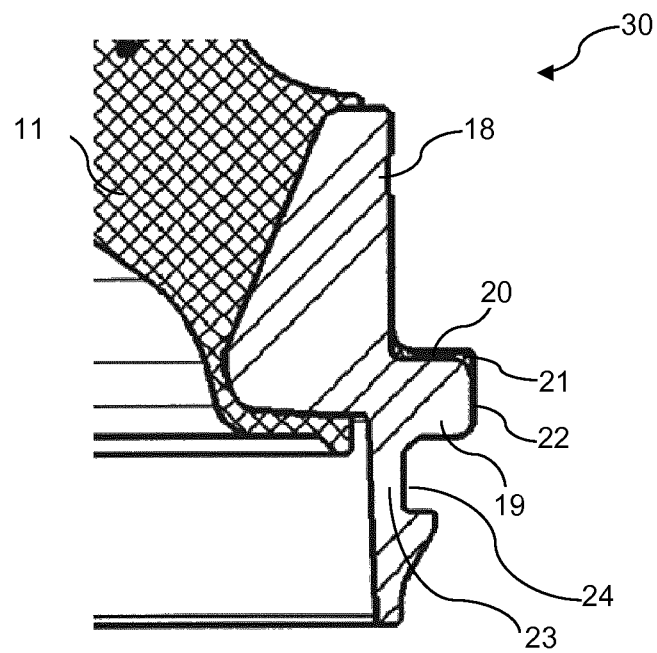
FIG. 2 shows an enlarged sectional view of the support spring with the outer ring vulcanized thereinto, wherein other components have been omitted.
Figure 3:
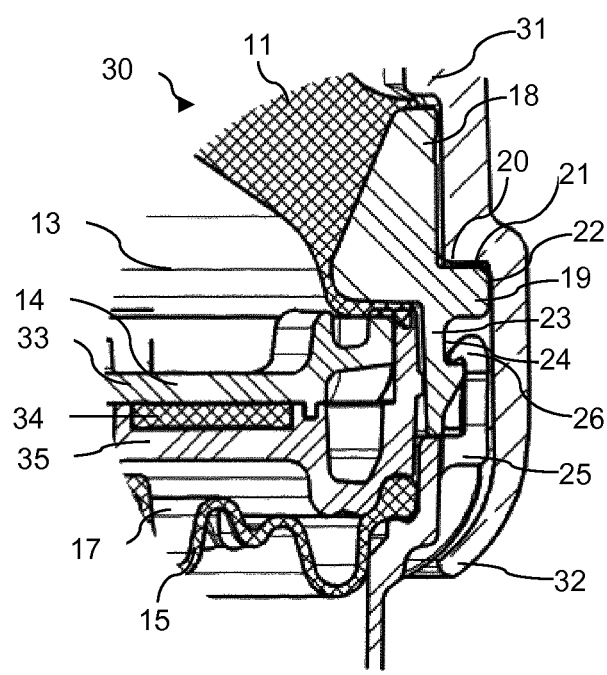
FIG. 3 shows an enlarged view of the area circled in a dashed manner in FIG. 1.

FIGS. 2 and 3 show additional views of the outer ring 18. In particular the surrounding members, i.e. the housing 31, the intermediate plate 14, the cover 25 and the compensation membrane 15, were omitted in FIG. 2. FIG. 3 shows an enlarged section of the region surrounding the outer ring 18.

In summary, an insertion of the hydraulic module 30 into the housing 31 with a rotary movement is facilitated in the hydraulic mount according to the invention, due to the non-rubber-lined radial outer surface 22 of the outer ring 18.

The rubber-lined axial abutment surface 20 of the outer ring 18 is pressed against the housing 31 in the assembled state. Thus, the transition from static friction to sliding friction at this contact surface in the case of transverse load is shifted, so that unwanted noises caused by the so-called stick-slip phenomenon during a relative movement of the outer ring 21 relative to the housing 31 are suppressed.

LIST OF REFERENCE NUMERALS

10 Hydraulic mount
11 Support spring
12 Mount core
13 Working chamber
14 Intermediate plate
15 Compensation membrane
16 Damping channel
17 Compensation chamber
18 Outer ring
19 Radial projection
20 Axial abutment surface
21 Rubber lining
22 Radial outer surface
23 Flange
24 Annular groove
25 Cover
26 Clip
27 Connecting opening
28 Bump stop
29 Screw coupling
30 Hydraulic module
31 Housing
32 Crimp
33 Upper nozzle plate
34 Decoupling membrane
35 Lower nozzle plate

The invention claimed is:

1. A hydraulic mount for mounting a motor vehicle engine on a vehicle body, comprising:
a hydraulic module with a support spring that supports a mount core, surrounds a working chamber, and is supported on an outer ring on which a cover is fixed, a compensation chamber which is separated from the working chamber by an intermediate plate and is delimited by a compensation membrane, wherein the compensation chamber and the working chamber are filled with a damping liquid and are connected with each other in a liquid-conducting manner via a damping channel arranged in the intermediate plate; and a housing accommodating the hydraulic module, the housing allowing a rotary movement of the hydraulic module inside and relative to the housing, wherein the outer ring has a radial projection, and the radial projection is provided with a rubber-lined axial abutment surface and a non-rubber-lined radial outer surface;

wherein a radial clearance is provided between the hydraulic module and the housing, wherein the outer ring has an axially projecting flange with an annular groove for clipping in the cover, and wherein the housing comprises a stop which limits the rotary movement of the hydraulic module inside the housing to fix the hydraulic module relative to the housing.

2. The hydraulic mount according to claim 1, wherein the housing abuts against the axial abutment surface of the outer ring, the housing reaching around the outer ring and a clip of the cover.

3. The hydraulic mount according to claim 1, wherein the outer ring is made from a plastic.

4. The hydraulic mount according to claim 1, wherein the outer ring is made from polyamide.

5. The hydraulic mount according to claim 1, wherein a thickness of a rubber lining of the axial abutment surface is between 0.5 mm and 2 mm.

6. The hydraulic mount according to claim 1, wherein the hydraulic module is fixed to the housing in an axial direction by means of a crimp.

7. A method for assembly of a hydraulic mount comprising a pre-assembled hydraulic module and a housing accommodating the hydraulic module, the method comprising:
(a) inserting the pre-assembled hydraulic module into the housing in such a manner that bump stops can be guided through a connecting opening;
(b) rotating the hydraulic module relative to the housing by an installation angle so that the housing abuts against an axial abutment surface and reaches around an outer ring and a clip of a cover; and
(c) crimping the housing for fixing and securing the hydraulic module in the housing in an axial direction.

* * * * *